United States Patent
Mitsuda (10) Patent No.: US 7,630,279 B2
(45) Date of Patent: Dec. 8, 2009

(54) METHOD OF FOCUS ERROR SIGNAL ADJUSTMENT IN OPTICAL DISK DEVICE AND OPTICAL DISK DRIVE

(75) Inventor: Hiroshi Mitsuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 377 days.

(21) Appl. No.: 11/602,305

(22) Filed: Nov. 21, 2006

(65) Prior Publication Data

US 2007/0127330 A1 Jun. 7, 2007

(30) Foreign Application Priority Data

Dec. 1, 2005 (JP) ............................. 2005-347557

(51) Int. Cl.
*G11B 7/00* (2006.01)
(52) U.S. Cl. ................. 369/44.26; 369/44.35
(58) Field of Classification Search .............. 369/44.26, 369/44.35, 44.11, 44.29, 30.03; 365/202
See application file for complete search history.

(56) References Cited

U.S. PATENT DOCUMENTS

| 6,654,322 | B2 * | 11/2003 | Komoike et al. | ......... 369/44.29 |
| 2002/0191499 | A1 * | 12/2002 | Ando et al. | ............ 369/30.03 |
| 2004/0100841 | A1 * | 5/2004 | Buchler et al. | ............ 365/202 |

FOREIGN PATENT DOCUMENTS

| JP | 2001-222826 A | 8/2001 |
| JP | 2003-233915 A | 8/2003 |

OTHER PUBLICATIONS

Isaoh Satoh et al., Key Technology for High Density Rewritable DVD (DVD-RAM), Mar. 1998, IEEE, Transactions on Magnetics, vol. 34, No. 2, pp. 338-339.*

* cited by examiner

*Primary Examiner*—Ali Neyzari
(74) *Attorney, Agent, or Firm*—Crowell & Moring LLP (57) ABSTRACT

A method for a focus error signal adjustment in an optical disk device which shapes a focus error signal and enables a high-accuracy focus servo is provided.

In a DVD-RAM having an emboss data zone and a rewritable data zone, a focus error signal is generated with the DVD-RAM remaining still in a position where an emboss pit is not formed in the rewritable data zone, and a waveform of the FE signal is shaped so that the waveform is symmetrical with respect to a reference point. Then, the FE signal is generated in the emboss data zone and an amplitude of the FE signal is adjusted. The amplitude of the signal which is obtained by increasing the the amplitude of the FE signal whose amplitude is adjusted by approximately 6 dB is applied to the amplitude of the focus error signal in the rewritable data zone. Consequently, a high-accuracy focus servo based on the FE signal, whose amplitude is adjusted and waveform is shaped, can be achieved without an error caused by the emboss pit.

7 Claims, 7 Drawing Sheets

FIG. 3A
OPTICAL DISK IS IN
OPTIMAL POSITION

FIG. 3B
OPTICAL DISK IS CLOSER TO
OBJECTIVE LENS THAN
POSITION OF FOCUS POINT

FIG. 3C
OPTICAL DISK IS FARTHER
FROM OBJECTIVE LENS THAN
POSITION OF FOCUS POINT

FIG. 4A
FE SIGNAL

FIG. 4B
AMPLITUDE ADJUSTMENT

FIG. 4C
S-SHAPED BALANCE
ADJUSTMENT

METHOD OF FOCUS ERROR SIGNAL ADJUSTMENT IN OPTICAL DISK DEVICE AND OPTICAL DISK DRIVE

BACKGROUND OF THE INVENTION

1. Field of the Invention

The present invention relates to a method of a focus error signal adjustment in an optical disk device, which shapes a S-shaped focus error signal used for carrying out a focus servo and which adjusts an amplitude and S-shaped balance of the signal, and the optical disk device thereof.

2. Description of the Related Art

Conventionally, in an optical disk device, a focus error signal is generated, on the basis of a laser beam reflected on a data recording layer, by irradiating the laser beam on the data recording layer of the optical disk. Here, the focus error signal is a signal obtained by changing a focus position of the laser beam. When generating the focus error signal, the focus servo is carried out on the basis of the signal. The focus servo enables the focus to be in an appropriate position on the optical disk, and then enables an accurate reading and recording of a data. Thus, a regular waveform of the focus error signal without an error is necessary.

Consequently, a disk player is well-known in that it generates the focus error signal by changing the focus position of an optical pickup, with the optical disk remaining still, so that the waveform of the focus error signal is well-balanced, and that then adjusts a S-shaped curve of the signal to be axisymmetrical with centering on a reference level (refer to Japanese Laid-Open Patent Publication No. 2001-222826, for example).

Also, an optical disk recording/playing method is well-known in that when recording and playing the optical disk, it adjusts the focus position so that an emboss pit data is played optimally in an adjustment area, which has emboss pit rows, for an accurate data record/play while maintaining an optimal focus condition, and afterward, it determines a focus detection error occurred in a land portion in a space, and when recording and playing in the land portion or a groove portion, the focus position is controlled by correcting the focus detection error determined in the optimal focus position in the emboss pit data (refer to Japanese Laid-Open Patent Publication No. 2003-233915, for example).

However, a technique described in the Patent Publication No. 2001-222826 cannot prevent a problem that when the emboss pit to which a CAPA (Complementary Allocated Pit Address) is allocated is in a land track and a groove track in the optical disk, an error occurs in the waveform of the focus error signal due to the emboss pit. Also, a technique described in the Patent Publication No. 2003-233915 cannot enable a formation of the waveform by increasing and decreasing an amplitude of the focus error signal and by making the waveform of the focus error signal be symmetrical with respect to a reference point.

SUMMARY OF THE INVENTION

The present invention is to solve the problem of the conventional art described above, and an object of the present invention is to provide a method of a focus error signal adjustment in an optical disk device which enables an accurate focus servo on the basis of a focus error signal whose amplitude is adjusted and waveform is shaped.

To achieve the object described above, the present invention provides a method of a focus error signal adjustment in an optical disk device which records/plays a data on an optical disk by irradiating a laser beam on the optical disk, wherein the optical disk comprises an emboss data zone in which a control data of a type of the optical disk, a system of a format, and a data recording method is recorded and a rewritable data zone which enables a rewrite through a test record, and an emboss pit to which a CAPA (Complementary Allocated Pit Address) is allocated is formed in the rewritable data zone, and a method of a focus error signal adjustment comprises a signal generation step which irradiates a laser beam on the optical disk, receives a laser beam reflected on the optical disk, and generates a focus error signal on the basis of the received laser beam, and an amplitude adjustment step which adjusts an amplitude by increasing and decreasing the amplitude of a focus error signal obtained by carrying out the signal generation step in the emboss data zone, wherein an amplitude of the focus error signal, which is obtained by carrying out the amplitude adjustment step, is increased, and then the increased amplitude of the signal is applied to an amplitude of a focus error signal in the rewritable data zone, and consequently, a focus servo can be carried out without being affected by an emboss pit formed in the rewritable data zone.

According to the present invention, the amplitude adjustment step is carried out on the basis of the focus error signal, which is obtained by carrying out the signal generation step in the emboss data zone, and the amplitude of the focus error signal, which is obtained by this signal generation step, is increased, and then the focus error signal having the increased amplitude is applied to the focus error signal waveform in the rewritable data zone. Consequently, the focus error signal waveform in the rewritable data zone can be safe from a negative effect from the emboss pit. As a result, a high-accuracy focus servo on the basis of the focus error signal, whose amplitude is adjusted, can be achieved.

In one embodiment of this invention, the method of the focus error signal adjustment in the optical disk device, wherein an amplitude of a focus error signal, which is obtained by carrying out the amplitude adjustment step, is increased by approximately 6 dB, and then the increased amplitude of the signal is applied to an amplitude of a focus error signal in the rewritable data zone.

According to the present invention, in case that the amplitude of the focus error signal in the rewritable data zone is larger than the amplitude of the focus error signal in the emboss data zone by approximately 6 dB, the most appropriate amplitude value in the rewritable data zone can be figured out by increasing the amplitude by approximately 6 dB. As a result, a high-accuracy focus servo on the basis of the focus error signal, whose amplitude is adjusted, can be achieved.

In another embodiment of this invention, the method further comprising a waveform shaping step which shapes a waveform of a focus error signal, which is obtained by carrying out the signal generation step, so that the waveform is axisymmetrical with centering on a reference level, wherein the signal generation step is carried out with the optical disk remaining still in a position where the emboss pit is not formed in the rewritable data zone, and also carried out in the emboss data zone, the waveform shaping step shapes a waveform of a focus error signal, which is obtained by carrying out the signal generation step in the rewritable data zone, with the optical disk remaining still, and the amplitude adjustment step adjusts an amplitude of a focus error signal, which is obtained by carrying out the signal generation step in the emboss data zone, increases an amplitude of a focus error signal, which is obtained by carrying out the waveform shaping step and the amplitude adjustment step, by approximately 6 dB, and then applies the increased amplitude of the signal to an amplitude of a focus error signal in the rewritable data zone.

According to the present invention, the focus error signal waveform is shaped in a position where the emboss pit is not formed in the rewritable data zone, with the optical disk remaining still, so that an irregular shape of the focus error signal waveform due to an error can be avoided. On the contrary, in case that the focus error signal is generated and the signal waveform is shaped in the emboss pit in the rewritable data zone while the optical disk is rotated, the focus error signal waveform will include an error caused by the negative effect of the emboss pit. Consequently, a high-accuracy focus servo can be achieved by shaping the focus error signal waveform with the optical disk remaining still, as described above.

In another embodiment of this invention, an optical disk device which carries out the method of the focus error signal adjustment described in the above.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

A method of a focus error signal adjustment in an optical disk device according to a preferred embodiment of the present invention is described with reference to FIGS. 1 to 7. The optical disk device of the present preferred embodiment is composed of an optical disk recording device 1. An optical disk of the present preferred embodiment is composed of a DVD-RAM (DVD Random Access Memory).

Figure 1:
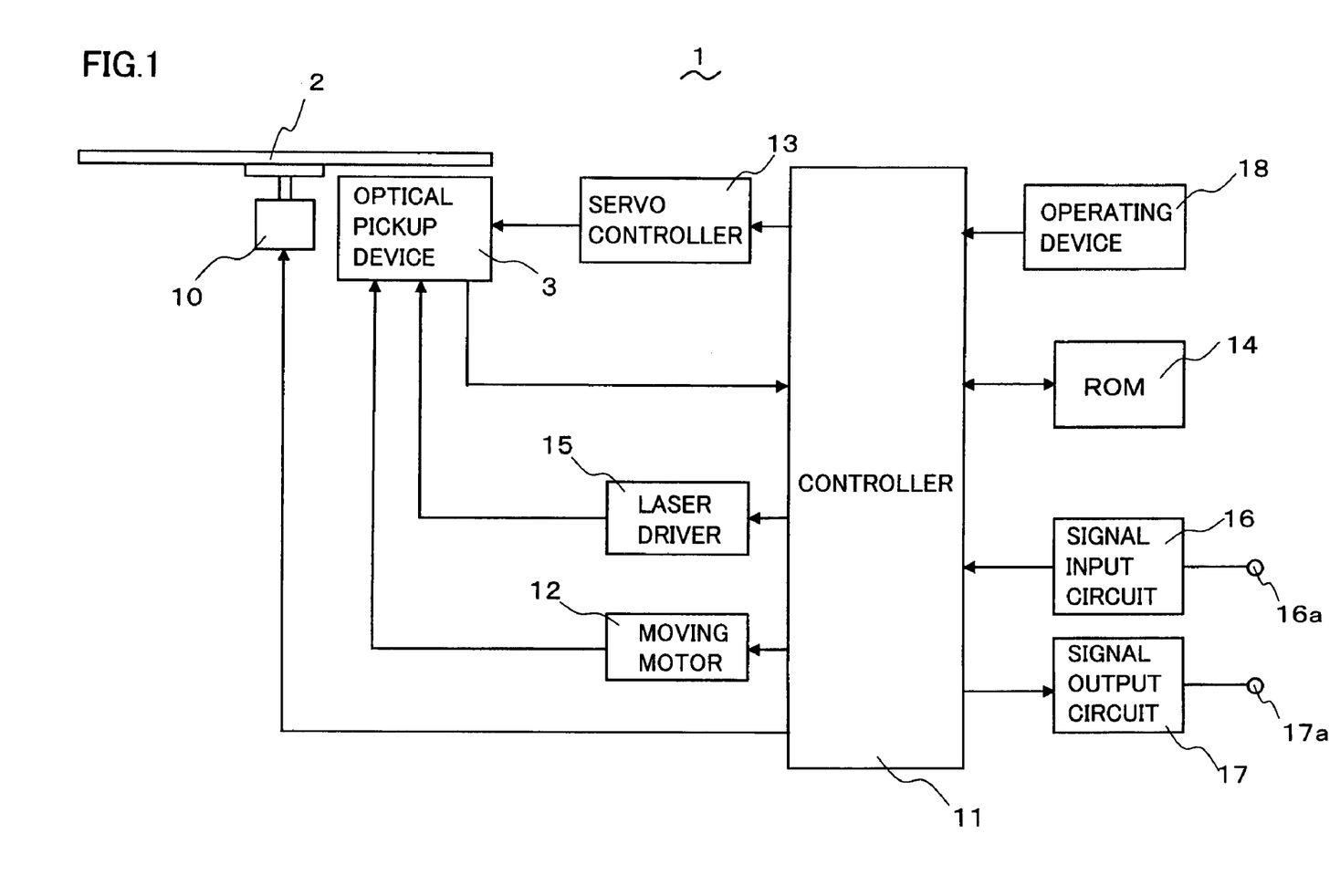
FIG. 1 is a block diagram illustrating a composition of an optical disk recording device according to a preferred embodiment of the present invention.

FIG. 1 shows a composition of an optical disk recording device in which an optical pickup device is installed. The optical disk recording device 1 comprises an optical pickup device 3 which records a data on an optical disk 2 and reads in a data from the optical disk 2, a controller 11 which is composed of a control circuit such as a CPU (Central Processing Unit) or the like, and an operating device 18 which is operated by a user to provide an instruction to the controller 11. The optical disk recording device 1 is a DVD recorder or a DVD drive installed in a personal computer, for example.

The optical disk 2 is put in the optical disk recording device 1 by a user and then attached to a spindle motor 10. The spindle motor 10 is rotatively driven by the controller 11 and then rotates the attached optical disk 2. A moving motor 12 is composed of a linear motor and moves the optical pickup device 3 on the optical disk 2 in a radial direction of the optical disk 2.

The optical pickup device 3 comprises a semiconductor laser diode (Laser Diode; abbreviated as LD hereinafter) which outputs a laser beam. A mode of the optical pickup device 3 includes a play mode to play a data recorded on the optical disk 2 and a record mode to record a data on the optical disk 2.

In case of the play mode, the optical pickup device 3 irradiates the laser beam and detects a mark and a space formed on the optical disk 2. The optical pickup device 3 also receives a reflected laser beam which is reflected on the optical disk 2 and reads in the data recorded on the optical disk 2. The reflected laser beam including the recorded data is photoelectrically changed by the optical pickup device 3, and then a regenerative signal of the data is generated. Here, the regenerative signal is a RF signal, and the RF signal is output from the optical pickup device 3 to the controller 11.

In case of the record mode, when a semiconductor laser diode irradiates the laser beam on the optical disk 2, a mark and a space are formed on the optical disk 2, and thus the data is recorded. Through a data recording/reading operation, the controller 11 makes the optical pickup device 3 irradiate the laser beam on the optical disk 2 and then makes it receive the reflected laser beam, and moreover, rotates the optical disk 2 by rotating the spindle motor 10.

When the optical disk 2 is vibrated due to the rotation of the optical disk 2 during the data record/play, a distance between the optical disk 2 and an objective lens (not shown) which gathers the laser beam and irradiates it on the optical disk 2 fluctuates accordingly. Thus, the laser beam gathered by the objective lens becomes out of focus for the reason that it departs from a data record/read position on the optical disk 2, and thus a focus error occurs. The controller 11 detects the focus error on the basis of an output signal from the optical pickup device 3, generates an focus error signal, and then output it to a servo controller 13. The servo controller 13 carries out a focus servo on the basis of the focus error signal from the controller 11. A focusing coil (not shown) built into the optical pickup device 3 is driven by the focus servo. Consequently, a position of an objective lens (not shown) controlled by the focusing coil is controlled, and a focus position of the laser beam irradiated on the optical disk 2 is thus controlled.

A ROM 14 stores various programs. The controller 11 controls the entire device on the basis of the programs. The ROM 14 stores, for example, a program to increase or decrease the amplitude of the focus error signal, or to shape a waveform of the signal.

A laser driver 15 is composed of a laser drive circuit, and also controls a beam emission timing of a LD and a power of the laser beam on the basis of the signal from the controller 11.

A signal input circuit 16 is composed of a signal input circuit, and also operates on the basis of the signal from the controller 11. Various signals, which indicate a data such as a video, an audio, a document, and so on, are input from an external equipment such as a video camera or the like (not shown) through a signal input terminal 16a. A signal output circuit 17 is composed of a signal output circuit, and also operates on the basis of the signal from the controller 11. Signals, which indicate a signal, input from the signal input circuit 16, and a data, stored in the optical disk 2, are output from the signal output circuit 17 to an external equipment such as a monitor, a speaker, a personal computer, or the like (not shown) through a signal output terminal 17a.

An operating device 18 comprises various manual operation buttons which is operated by a user to give an instruction of various operations in the optical disk recording device 1, such as a recording of a data of a video or the like on the optical disk 2, a playing of a data stored in the optical disk 2, and so on, and by operating the various manual operation buttons, signals responding to the operations are sent out to the controller 11.

The data is stored in the optical disk 2 by encoding the signals and so on, which are input from the signal input circuit 16, in the controller 11, and by making the optical pickup device 3 form a mark and a space on the optical disk 2 to have a length and an alignment corresponding to the encoded data on the basis of the signals from the controller 11.

The data stored in the optical disk 2 is read by making the optical pickup device 3 detect the mark and the space formed on the optical disk 2, and by determining the length and the alignment of the mark and the space and then reading the encoded data in the controller 11.

Figure 2:
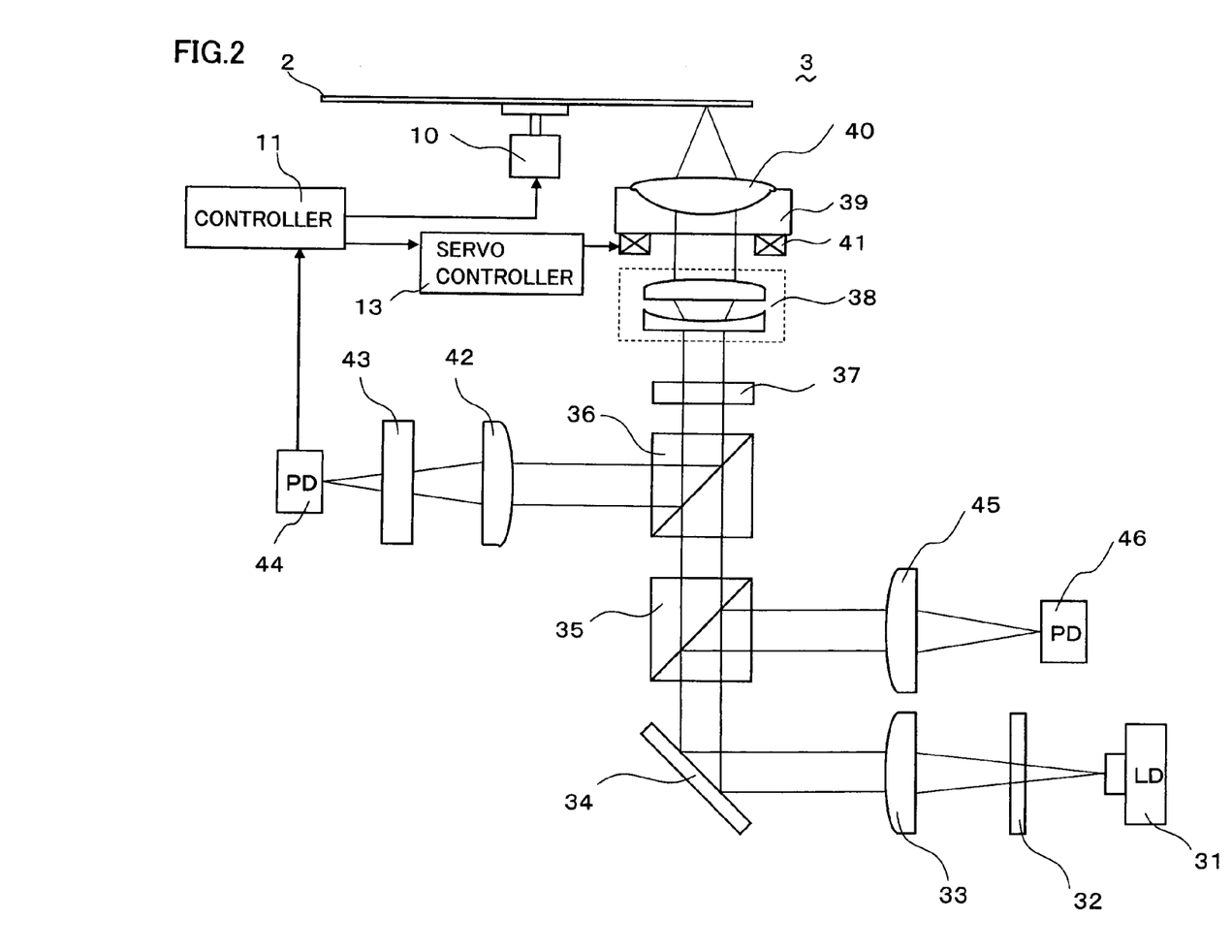
FIG. 2 is a diagram illustrating a composition of an optical pickup device comprising the optical disk recording device described above.

FIG. 2 shows a composition of the optical pickup device 3. In the optical pickup device 3, a LD 31 outputs a laser beam to the optical disk 2. The laser beam is gathered by an objective lens 40 and then irradiated on the optical disk 2. The laser beam reflected on the optical disk 2 is reflected on a polarization beam splitter 36 and then enters a photo detector 44 (abbreviated as PD hereinafter). The PD 44 outputs an optical detection signal on the basis of the received laser beam.

When the optical disk 2 is inserted into the optical disk recording device 1, the controller 11 determines a type of the optical disk 2. For example, the controller 11 determines whether the optical disk 2 is a DVD-RAM or not.

The LD 31 outputs a laser beam corresponding to the type of the optical disk 2 on the basis of the signal from the laser driver 15. The LD 31 is composed of an infrared light LD and a red LD. In case that the optical disk 2 is a CD (Compact Disc), an infrared laser beam is output from the infrared light LD. Besides, in case that the optical disk 2 is a DVD, a red laser beam is output from the red LD.

The laser beam output from the LD 31 enters a diffraction grating 32. In case of a playing of the data in the CD or a recording the data on the CD, the diffraction grating 32 separates the laser beam into three laser beams. A main laser beam is used for playing the data and so on. The remaining two laser beams are used for controlling the focus of the laser beam irradiated on the optical disk 2 or for aligning the laser beam on a track on the optical disk 2.

The laser beam output from the diffraction grating 32 enters a collimate lens 33. The collimate lens 33 converts the laser beam entered it into a collimated light. The laser beam, which is converted into the collimated light, is reflected on a mirror 34 and then goes to the optical disk 2. The laser beam reflected on the mirror 34 enters a beam splitter 35. The beam splitter 35 separates the laser beam into two laser beams. One of the two laser beams passes through the beam splitter 35 and is guided to the optical disk 2 through the polarization beam splitter 36. The other laser beam is reflected on the beam splitter 35 and then guided to a PD 46.

The laser beam which passes through the beam splitter 35 enters the polarization beam splitter 36. The polarization beam splitter 36 changes its transmission and reflectance ratio in response to a polarization direction of the laser beam. Here, a surface made by a normal line of a surface, which the laser beam which is output from the LD 31 enters, and a traveling direction of the laser beam is called as an acceptance surface. The polarization beam splitter 36 transmits a linearly-polarized light which oscillates in a direction parallel to the acceptance surface, and reflects a linearly-polarized light which oscillates in a direction perpendicular to the acceptance surface. In the laser beam output from the LD 31, a linearly-polarized laser beam which oscillates in the direction parallel to the acceptance surface passes through the polarization beam splitter 36 and then, it is irradiated on a beam expander 38 through a quarter wavelength plate 37.

The quarter wavelength plate 37 converts a linearly-polarized light into a circular polarized light and converts a circular polarized light into a linearly-polarized light. The laser beam which is output from the LD 31 is a linear-polarized light so as to be irradiated on the optical disk 2, and the quarter wavelength plate 37 converts the laser beam into a circular polarized light.

The laser beam which is converted into the circular polarized light then enters the beam expander 38. The beam expander 38 diverges/converges slightly the laser beam passing through it. Consequently, a beam width and an entry angle of the laser beam entering the objective lens 40 changes. The focus position of the laser beam which is gathered by the objective lens 40 changes due to the change of the beam width and so on, and accordingly, a spherical aberration can be corrected. The laser beam which is output from the beam expander 38 goes to the objective lens 40 maintained by a lens holder 39.

The objective lens 40 gathers the laser beam passing through the beam expander 38. The laser beam gathered by the objective lens 40 is irradiated on the optical disk 2. A focusing coil 41 controls a position of the objective lens 40 on the basis of the signal from the servo controller 13. A position of a focus point of a beam, which is output from the LD 31 and then gathered on the optical disk 2, is adjusted with a movement of the objective lens 40.

The reflected laser beam reflected on the optical disk 2 enters the quarter wavelength plate 37 through the objective lens 40 and the beam expander 38. The reflected laser beam which is a circular polarized light is converted into a linearly-polarized light at the quarter wavelength plate 37. The reflected laser beam becomes a circular polarized light which rotates in a direction reverse of that before being reflected, thus the reflected laser beam which is a linearly-polarized light converted by the quarter wavelength plate 37 oscillates in a direction perpendicular to the acceptance surface described above.

The reflected laser beam converted into the linearly-polarized light enters the polarized beam splitter 36. The reflected laser beam which enters the polarized beam splitter 36 oscillates in the direction perpendicular to the acceptance surface described above, so that the reflected laser beam is entirely reflected on the polarized beam splitter 36, and then enters the PD 44 through a collective lens 42 and a cylindrical lens 43. The collective lens 42 is used for gathering the reflected laser beam and irradiating the reflected laser beam, which is gathered, on the PD 44. The cylindrical lens 43 is used for detecting the focus error with an astigmatic method.

The PD 44 is output from the LD 31, and then receives and detects the reflected laser beam which is reflected on the optical disk 2. The reflected laser beam includes a recorded data such as a video, an audio, and so on, which are stored in the optical disk 2. The PD 44 generates an optical detection signal on the basis of a power of the reflected laser beam received thereby. The optical detection signal includes a data of the focus error indicating that the focus of the laser beam is out of position where the laser beam is to be gathered. The optical detection signal is output to the controller 11.

The controller 11 detects the focus error on the basis of the optical detection signal from the PD 44, generates a focus error signal, and then outputs it to the servo controller 13. The servo controller 13 carries out a focus servo on the basis of the focus error signal from the controller 11. The focusing coil 41 is driven by the focus servo. As a result, the position of the objective lens 40 which is controlled by the focusing coil 41 is adjusted, and thus the focus position of the laser beam irradiated on the optical disk 2 is controlled.

In the laser beam output from the LD 31, the laser beam reflected on the beam splitter 35 enters the PD 46 through a collective lens 45. The PD 46 generates an optical detection signal on the basis of a power of the reflected laser beam received thereby. The power of the laser beam output from the LD 31 based on the optical detection signal is controlled by the controller 11.

Figure 3A:
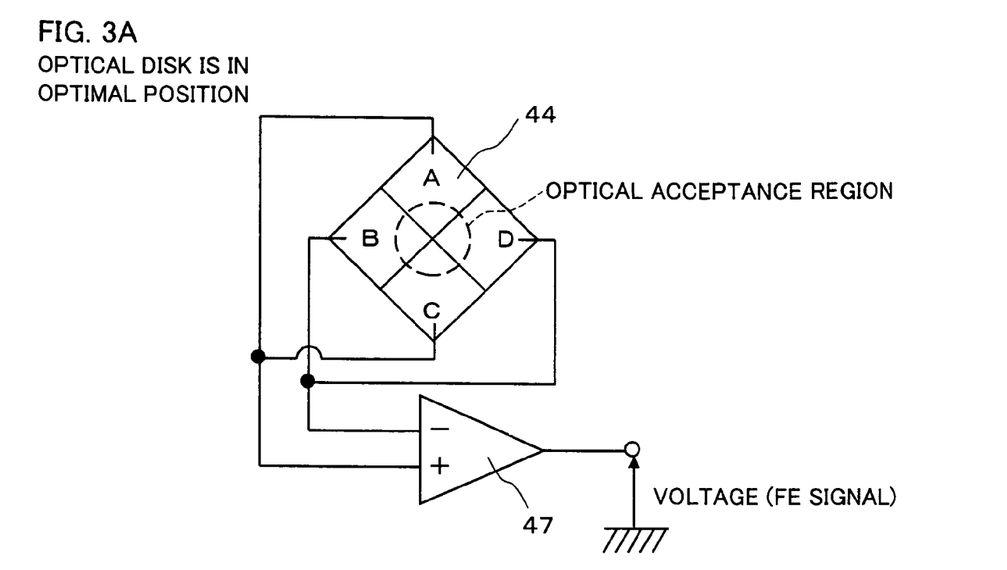
FIGS. 3A to 3C are diagrams illustrating a focus error detection circuit comprising the optical pickup device described above and a focus error detection method using it.
Figure 3B:
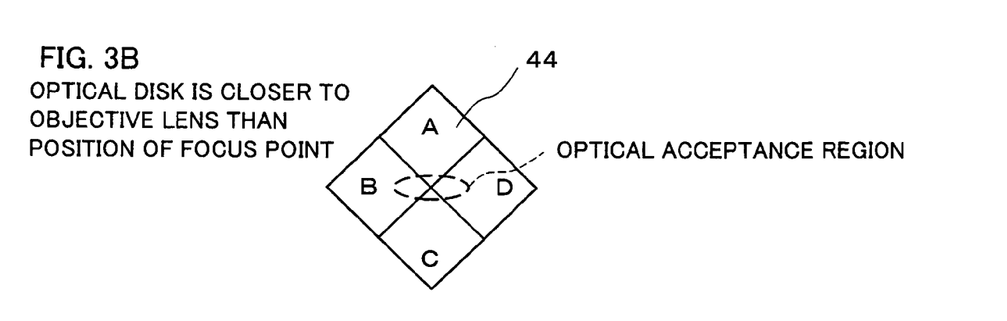
Figure 3C:
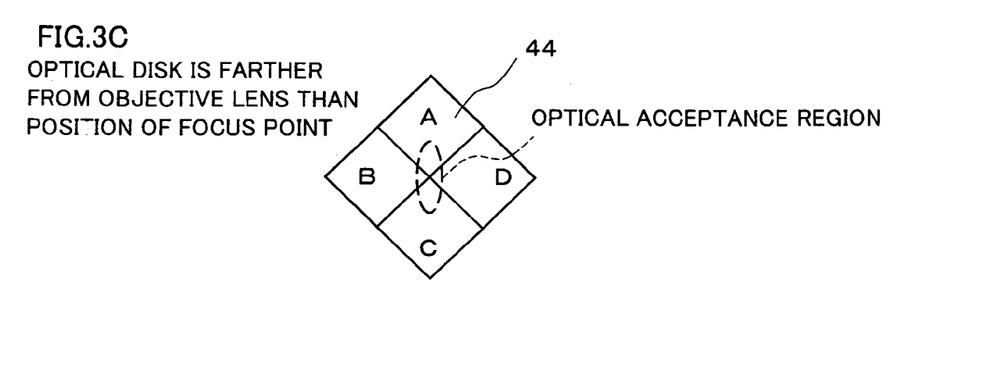

FIGS. 3A, 3B, and 3C show separately a focus error detection circuit including the PD 44 and a focus error detection method using it. Each diagram of the focus error detection circuit shown in these drawings is a simplified circuit diagram in which a resistance and so on are not shown. In addition, the focus error detection method shown in these drawings is based on an astigmatic method.

The focus error detection circuit includes the PD 44 and an amplifier 47. An acceptance surface of the PD 44 is divided into four sides, that is, a A side, a B side, a C side, and a D side. Each power of these sides is increased and decreased by the amplifier 47, and is output to the controller 11 as a focus error (FE) signal. Here, when output voltages of the A, B, C, and D sides are represented by a, b, c, and d, respectively, the FE signal is represented by $a+c-(b+d)$ a differential output voltage between the pair of the acceptance surfaces in a diagonal position with each other. The FE is consequently detected.

Next, the focus error detection method according to the astigmatic method is described. As shown in FIG. 2, the cylindrical lens 43 is disposed between the collective lens 42, which gathers the reflected laser beam, and the PD 44. In case that the focus point of the laser beam is positioned on a data recording layer of the optical disk 2, in other words, in case that the optical disk 2 is in an optimal position (refer to FIG. 3A), an image of the reflected laser beam has a circular shape on the acceptance surface by the effect of the cylindrical lens 43. In case that the optical disk 2 comes closer to the objective lens 40 than the position of the focus point of the laser beam which is gathered by the objective lens 40 (refer to FIG. 3B) or goes farther from the objective lens 40 than the position of the focus point (refer to FIG. 3C), the image of the reflected laser beam, which has the circular shape on the acceptance surface, changes to have an oval shape. Consequently, a differential output changes in accordance with the change of the position of the focus point, and thus the FE is detected. A value of the FE signal changes in accordance with the change of the differential output.

In this manner, the laser beam is irradiated from the LD 31 on the optical disk 2, the PD 44 receives the laser beam which is reflected on the optical disk 2, and the FE detection circuit generates the FE signal on the basis of the received laser beam (signal generation step).

Figure 4A:
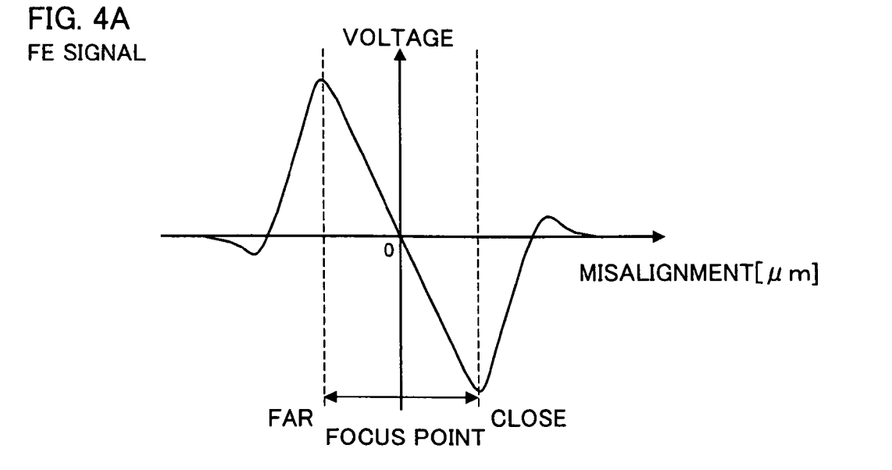
FIGS. 4A to 4C are diagrams illustrating waveforms of a focus error signal generated from the focus error detection circuit described above.
Figure 4B:
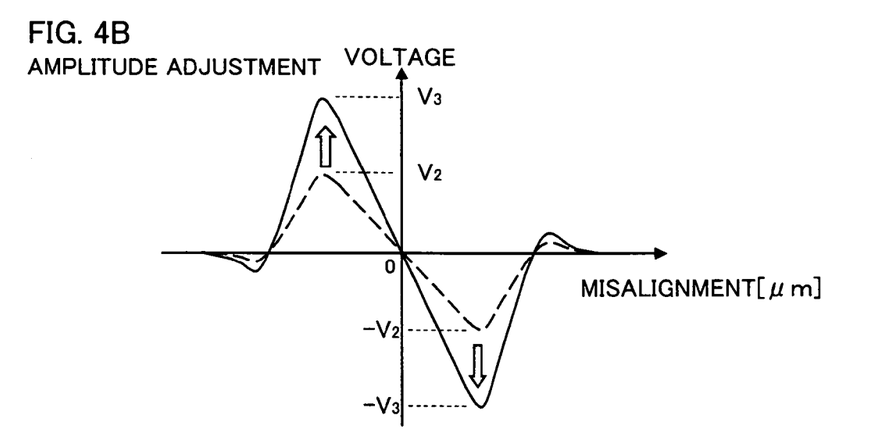
Figure 4C:
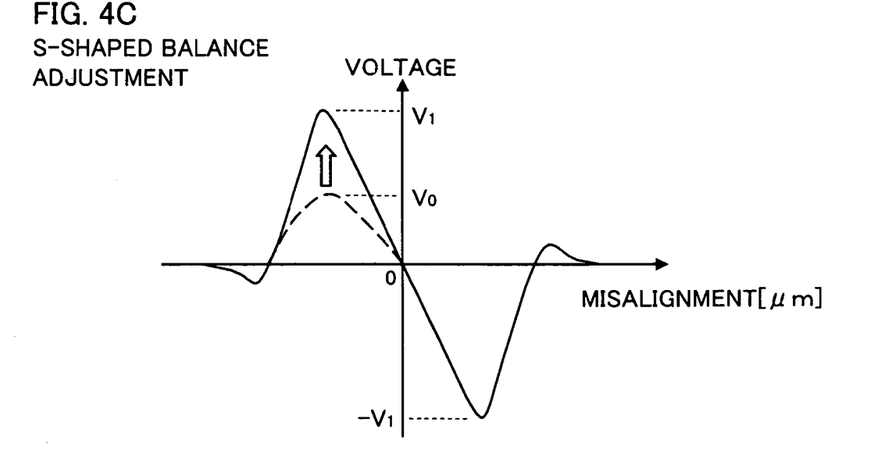

FIGS. 4A, 4B, and 4C show separately a waveform of the FE signal generated from the FE detection circuit described above. In case that the focus point of the laser beam gathered by the objective lens 40 is positioned on the data recording layer of the optical disk 2, an output voltage of the FE circuit (FE signal) becomes zero. In case that the optical disk 2 comes closer to the objective lens 40 than the position of the focus point, the FE signal voltage takes a negative value. In case that the optical disk 2 goes farther from the objective lens 40 than the position of the focus point, the FE signal voltage then takes a positive value. The FE signal voltage changes linearly in proportion to the misalignment of the focus point, as shown in FIG. 4A.

After the FE signal waveform is obtained by changing the focus position, the focus servo is carried out on the basis of the waveform. The position of the objective lens 40 is adjusted by the focusing coil 41 on the basis of the waveform so that the FE signal voltage becomes zero. Consequently, the focus point is adjusted to be in the optimal position on the data recording layer in the optical disk 2. Thus, an adjustment of the focus error signal waveform is necessary to avoid the FE signal waveform from having an irregular shape due to an error of the PD 44 and so on. The adjustment of the focus error signal waveform includes a S-shaped balance adjustment and an amplitude adjustment.

FIG. 4B shows a method of an amplitude adjustment (an amplitude adjustment step). The amplitude adjustment means that an amplitude of the FE signal is adjusted by increasing and decreasing an amplitude of it. For example, as shown in FIG. 4B, in case that the amplitude of the FE signal waveform is $V_2$, the amplitude adjustment is carried out by changing the amplitude to $V_3$. An amplitude value is determined in consideration of a dynamic range of the controller 11 which carries out the focus servo on the basis of the FE signal.

FIG. 4C shows a method of a S-shaped balance adjustment (a waveform shaping step). The S-shaped balance means that a waveform of the FE signal is shaped so that the waveform of it becomes symmetrical with respect to a reference point (an original point in FIG. 4C). For example, as shown in FIG. 4C, in case that a topside amplitude of the FE signal waveform is $V_0$ and a down side amplitude of it is $V_1$, the S-shaped balance adjustment is carried out by increasing the topside amplitude to $V_1$.

When generating the FE signal as shown in FIG. 4A described above, an error sometimes occurs in the FE signal for the reason that the optical disk 2 is a DVD-RAM having emboss pits. A detailed description is provided with reference to FIG. 5.

Figure 5:
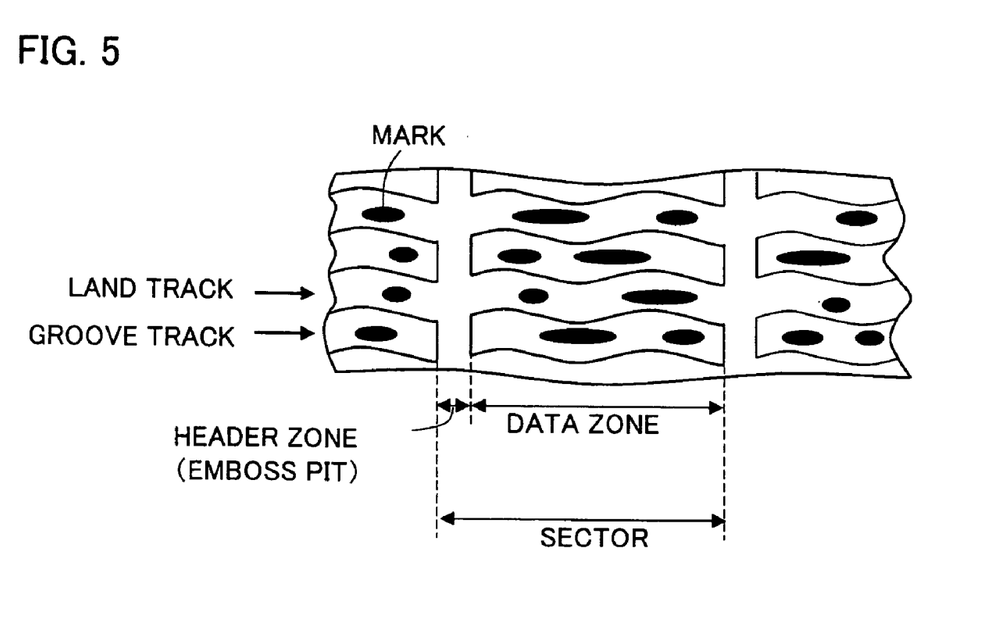
FIG. 5 is a diagram illustrating a structure of an optical disk according to the present preferred embodiment.

FIG. 5 shows a structure of a DVD-RAM which comprises the optical disk 2 having the emboss pits. As shown in FIG. 5, the DVD-RAM includes land tracks and groove tracks, and they are spirally formed on the disk, respectively, and moreover, each of them is formed alternately for every 360-degree roll of the disk. Marks are stored on both the land tracks and the groove tracks.

A sector, which is a unit of recording, is composed of a header zone and a data zone. In the DVD-RAM, an address data is basically provided by each emboss pit which is pre-formatted on the header zone of each sector. Each emboss pit is disposed with a slight shift in a direction of the tracks. Accordingly, the address can be allocated to each header zone in both the land track and the groove track. The address allocated to the header zone is called as CAPA (Complementary Allocated Pit Address).

In case that the laser beam is irradiated on the position where the emboss pit is not formed and subsequently on the position where the emboss pit is formed, along the groove track for the purpose of the generation of the FE signal, the position where the laser beam should be gathered changes due to the emboss pit. Consequently, the respective emboss pits affect the waveform of the FE signal, and then the error occurs.

The emboss pits are not formed in every region in the DVD-RAM. The DVD-RAM has an emboss data zone and a rewritable data zone in its lead-in region, and the emboss pits are formed in the rewritable data zone, not in the emboss data zone. A control data indicating a type of an optical disk, a system of a format, and a data recording method is stored in the emboss data zone. A region which can be rewritten through a test record and a region in which a data to handle a disk defect is stored are incorporated in the rewritable data zone.

Figure 6:
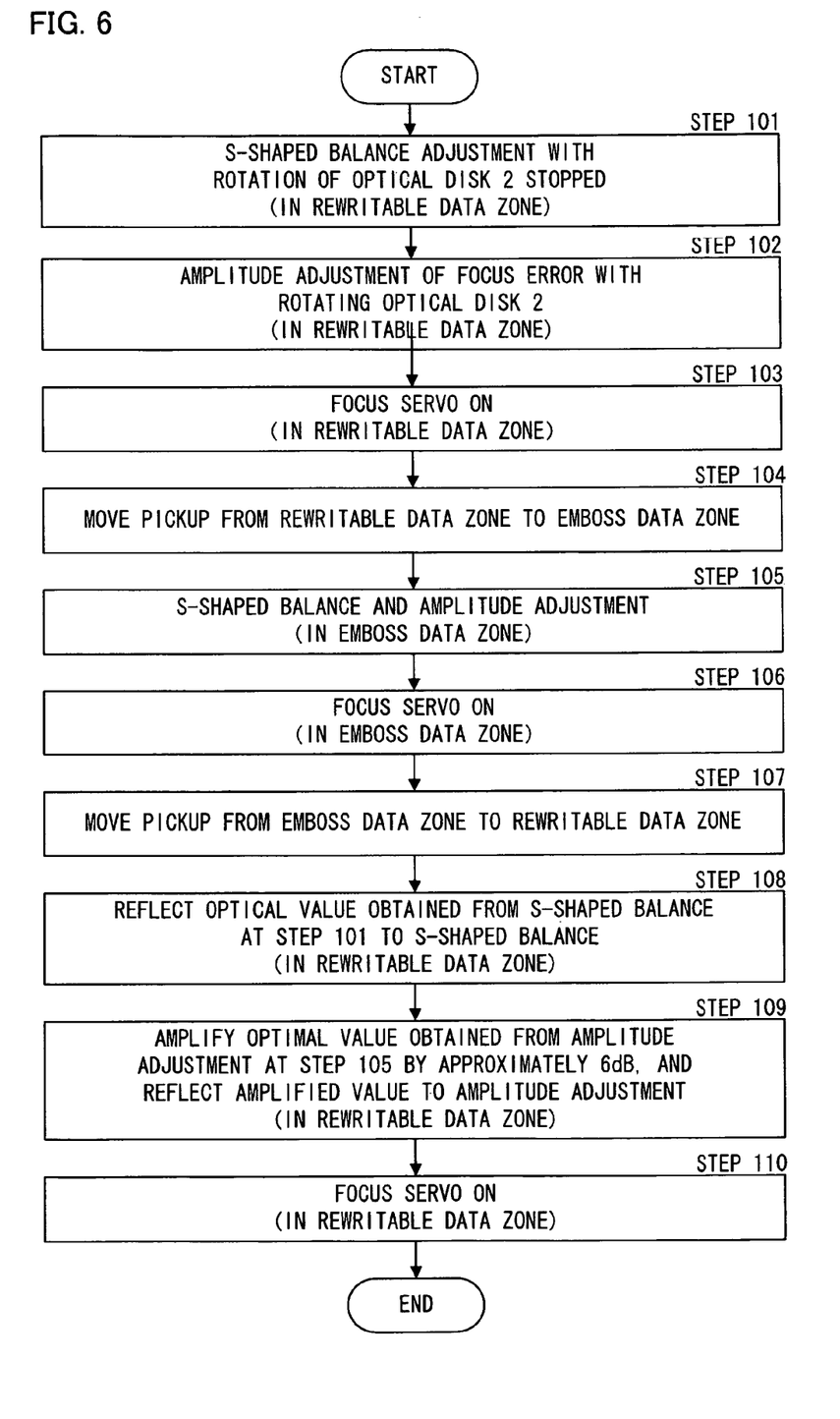
FIG. 6 is a flow chart illustrating a procedure of a method of a focus error signal adjustment in the optical disk recording device according to the present preferred embodiment.

FIG. 6 shows a procedure of a method of a focus error signal adjustment in the optical disk recording device 1 in case of irradiating the laser beam on the optical disk 2 having the emboss pits as shown in FIG. 5.

After the optical disk 2 is inserted into the optical disk recording device 1, the controller 11 makes the LD 31 irradiate the laser beam on the rewritable data zone of the optical disk 2 with the optical disk 2 remaining still (with the optical disk 2 stopping its rotation) to carry out the S-shaped balance adjustment. PD 44 receives the laser beam which is reflected on the rewritable data zone. The FE detection circuit generates the FE signal based on the received laser beam. The controller 11 carries out the S-shaped balance adjustment based on this FE signal (Step 101). In case of carrying out the S-shaped balance in the emboss pit during when the optical disk 2 rotates, the waveform of the FE signal takes an irregular shape caused by the emboss pit. Consequently, the irregular shape of the FE signal waveform can be avoided by carrying out the S-shaped balance adjustment with the optical disk 2 stopping its rotation. In this manner, the high-accuracy focus servo on the basis of the FE signal, whose waveform is shaped, can be achieved.

When carrying out the S-shaped balance adjustment with the optical disk 2 stopping its rotation, the S-shaped balance adjustment in the emboss pit (CAPA) is avoided. For example, a reflectance ratio of the emboss pit is different from that of the land track and the groove track, and consequently, the controller 11 detects the position of each emboss pit on the basis of a light volume of the reflected laser beam and then avoids the S-shaped balance adjustment in the emboss pit. In this manner, a loss of shape in the waveform of the FE signal can be avoided by not carrying out the S-shaped balance adjustment in the emboss pit (CAPA) with the optical disk 2 stopping its rotation.

After the S-shaped balance adjustment in the rewritable data zone, the controller 11 drives the spindle motor 10 and then rotates the optical disk 2. Subsequently, the rewritable data zone carries out the FE amplitude adjustment (Step 102). After the FE amplitude adjustment, the servo controller 13 carries out the focus servo on the basis of the signal from the controller 11 (Step 103). Through the focus servo, the focus point of the laser beam is to be in an appropriate position to some extent.

The optical pickup device 3 moves from a position to irradiate the laser beam on the rewritable data zone to a position to irradiate the laser beam on the emboss data zone (Step 104). After its moving, the LD 31 irradiates the laser beam on the emboss data zone, the PD 44 receives the laser beam reflected on the emboss data zone, and the FE detection circuit generates the FE signal based on the received laser beam. The S-shaped balance adjustment and the amplitude adjustment of the FE signal is carried out (Step 105). There is no emboss pit (CAPA) in the emboss data zone, thus the waveform of the FE signal does not lose its shape due to the negative effect of the emboss pit.

After the S-shaped balance adjustment and the amplitude adjustment in the emboss data zone, the focus servo is carried out in the emboss data zone (Step 106). Through the focus servo, the focus point of the laser beam is to be in an appropriate position to some extent.

The optical pickup device 3 moves from a position to irradiate the laser beam on the emboss data zone to a position to irradiate the laser beam on the rewritable data zone (step 107). An optimal value obtained by the S-shaped balance adjustment in the step 101 is reflected in the S-shaped balance adjustment in the rewritable data zone, and then the FE signal waveform is shaped (step 108).

Moreover, the optimal value obtained by the amplitude adjustment in the step 105 is increased by approximately 6 dB, the increased value is reflected in the amplitude adjustment in the rewritable data zone, and then the FE signal waveform is shaped (step 109). An experiment by the inventor of the present invention shows that the amplitude of the FE signal in the position, where the emboss pit is not formed in the rewritable data zone, is approximately 6 dB larger than the amplitude of the FE signal in the emboss data zone. Accordingly, the FE signal waveform in the rewritable data zone can be safe from a negative effect from the emboss pit by carrying out the amplitude adjustment in the emboss data zone which does not include emboss pit, increasing the amplitude of the FE signal, which is obtained by carrying out the amplitude adjustment, by approximately 6 dB, and applying the FE signal having the increased amplitude to the FE signal waveform in the rewritable data zone. As a result, the high-accuracy focus servo on the basis of the FE signal, whose amplitude is adjusted, can be achieved.

The controller 11 carries out the focus servo on the basis of the FE signal whose amplitude is adjusted and waveform is shaped, and moves the focus point of the laser beam to the optimal position (step 110). Through such a procedure, the amplitude of the FE signal is adjusted and the waveform of it is shaped, and thus the high-accuracy focus servo on the basis of the FE signal, whose amplitude is adjusted and waveform is shaped, can be achieved.

Figure 7:
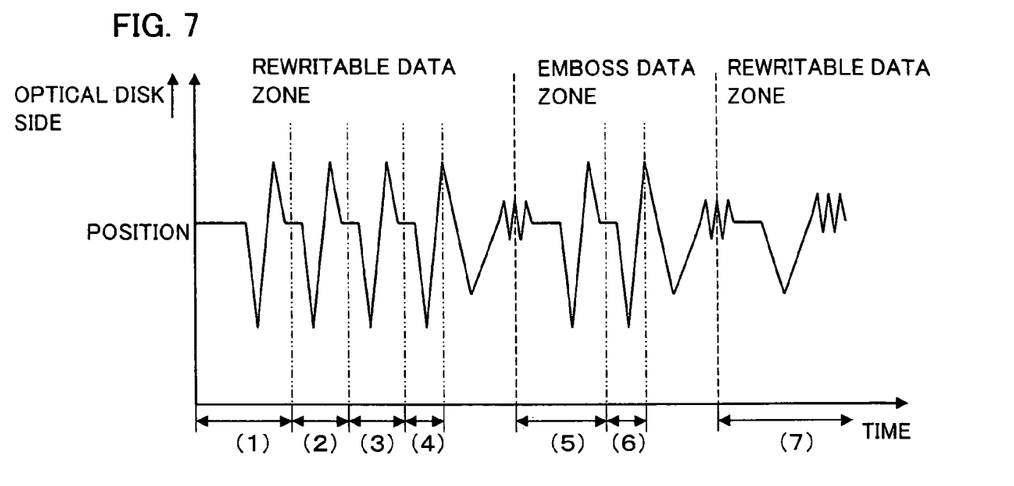
FIG. 7 is a diagram illustrating a change of a position of an objective lens comprising the optical pickup device described above.

FIG. 7 shows a change of a position of the objective lens 40 comprising the optical pickup device 3. In FIG. 7, (1) shows a change of a position for the S-shaped balance adjustment in the rewritable data zone (corresponding to the step 101 in FIG. 6). At this time, the optical disk 2 stops rotating. (2) shows a change of a position for the S-shaped balance adjustment and the amplitude adjustment in case that a CD is inserted into the optical disk recording device 1. Here, the controller 11 determines the type of the optical disk 2 on the basis of the sum of the focus signal (a+b+c+d in FIG. 3) and the FE signal. (3) shows a change of a position for the amplitude adjustment in case that the optical disk 2 is a DVD+RAM (corresponding to the step 102). (4) shows a change of a position to carry out the focus servo (corresponding to the step 103).

After the focus servo shown in (4), the position of the objective lens 40 moves from a position to irradiate the laser beam on the rewritable data zone to a position to irradiate the laser beam on the emboss data zone (corresponding to the step 104). As shown in (5), the position of the objective lens is changed for the S-shaped balance adjustment and the amplitude adjustment in the emboss data zone (corresponding to the step 105). Subsequently, as shown in (6), the focus servo is carried out (corresponding to the step 106).

After the focus servo shown in (6), the position of the objective lens 40 moves from a position to irradiate the laser beam on the emboss data zone to a position to irradiate the laser beam on the rewritable data zone (corresponding to the step 107). As shown in (7), in the rewritable data zone, the value of the S-shaped balance adjustment in (1) and the amplitude value which is obtained by increasing the value of the amplitude adjustment in (5) by approximately 6 dB are applied to the amplitude value of the FE signal. As a result, the high-accuracy focus servo on the basis of the FE signal, whose amplitude is adjusted and waveform is shaped, is carried out, and the focus point of the laser beam is adjusted to be in the optimal position.

The preferred embodiment applying the present invention is described above, however, the present invention is not limited to such a preferred embodiment, and various modifications are applicable in accordance with a purpose of use.

What is claimed is:

1. A method of a focus error signal adjustment in an optical disk device which records/plays a data on an optical disk by irradiating a laser beam on an optical disk, wherein
    the optical disk has an emboss data zone in which a control data of a type of the optical disk, a system of a format, and a data recording method is recorded and a rewritable data zone which enables a rewrite through a test record, and
    an emboss pit to which a CAPA (Complementary Allocated Pit Address) is allocated is formed in the rewritable data zone, and
    a method of a focus error signal adjustment comprises,
    a signal generation step which irradiates a laser beam on the optical disk, receives a laser beam reflected on the optical disk, and generates a focus error signal based on the received laser beam, and
    an amplitude adjustment step which adjusts an amplitude by increasing and decreasing the amplitude of a focus error signal obtained by carrying out the signal generation step in the emboss data zone, wherein
    an amplitude of the focus error signal, which is obtained by carrying out the amplitude adjustment step, is increased, and then the increased amplitude of the signal is applied to an amplitude of a focus error signal in the rewritable data zone, and consequently, a focus servo can be carried out without being affected by an emboss pit formed in the rewritable data zone.

2. The method of the focus error signal adjustment in the optical disk device described in claim 1, wherein
    an amplitude of a focus error signal, which is obtained by carrying out the amplitude adjustment step, is increased by approximately 6 dB, and then the increased amplitude of the signal is applied to an amplitude of a focus error signal in the rewritable data zone.

3. The method of the focus error signal adjustment in the optical disk device described in claim 1 further comprising,
    a waveform shaping step which shapes a waveform of a focus error signal, which is obtained by carrying out the signal generation step, so that the waveform is axisymmetrical with centering on a reference level, wherein
    the signal generation step is carried out with the optical disk remaining still in a position where the emboss pit is not formed in the rewritable data zone, and also carried out in the emboss data zone,
    the waveform shaping step shapes a waveform of a focus error signal, which is obtained by carrying out the signal generation step in the rewritable data zone, with the optical disk remaining still, and
    the amplitude adjustment step adjusts an amplitude of a focus error signal, which is obtained by carrying out the signal generation step in the emboss data zone, wherein
    an amplitude of a focus error signal, which is obtained by carrying out the waveform shaping step and the amplitude adjustment step, is increased by approximately 6 dB, and then applies the increased amplitude of the signal to an amplitude of a focus error signal in the rewritable data zone.

4. An optical disk device which carries out the method of the focus error signal adjustment described in claim 1.

5. A method of a focus error signal adjustment in an optical disk device which records/plays a data on an optical disk by irradiating a laser beam on an optical disk, wherein the optical disk has an emboss data zone in which a control data of a type of the optical disk, a system of a format, and a data recording method is recorded and a rewritable data zone which enables a rewrite through a test record and which includes an emboss pit to which a CAPA (Complementary Allocated Pit Address) is allocated, the method comprising:
    irradiating a laser beam on the emboss data zone of the optical disk;
    receiving a laser beam reflected from the emboss data zone of the optical disk;
    determining an amplitude adjustment for a focus error signal based on the received laser beam reflected from the emboss data zone of the optical disk; and
    applying the amplitude adjustment to an amplitude of a focus error signal in the rewritable data zone.

6. The method of claim 5, wherein the application of the amplitude adjustment comprises:
    increasing the determined amplitude adjustment by predetermined amount; and
    applying the increased amplitude adjustment to the amplitude of the focus error signal in the rewritable data zone.

7. The method of claim 6, wherein the predetermined amount is approximately 6 dB.

* * * * *

UNITED STATES PATENT AND TRADEMARK OFFICE
CERTIFICATE OF CORRECTION

| | | |
|---|---|---|
| PATENT NO. | : 7,630,279 B2 | Page 1 of 1 |
| APPLICATION NO. | : 11/602305 | |
| DATED | : December 8, 2009 | |
| INVENTOR(S) | : Hiroshi Mitsuda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this

Twenty-first Day of December, 2010

David J. Kappos
*Director of the United States Patent and Trademark Office*